United States Patent [19]

Hejazi

[11] Patent Number: 5,412,222
[45] Date of Patent: May 2, 1995

[54] STORAGE PHOSPHOR READER HAVING ERASE LAMP FEATURE FAILURE DETECTION

[75] Inventor: Shahram Hejazi, Webster, N.Y.

[73] Assignee: Eastman Kodak Company, Rochester, N.Y.

[21] Appl. No.: 85,855

[22] Filed: Jun. 30, 1993

[51] Int. Cl.[6] .............................................. G01N 23/04
[52] U.S. Cl. ...................................................... 250/588
[58] Field of Search ........................... 250/588; 315/129

[56] References Cited

U.S. PATENT DOCUMENTS

| | | | |
|---|---|---|---|
| Re. 31,847 | 3/1985 | Luckey | 250/581 |
| 3,184,637 | 5/1965 | Skinner | 315/129 |
| 3,643,248 | 2/1972 | Schott | 340/253 B |
| 3,681,653 | 8/1972 | Snyder | 315/106 |
| 3,753,224 | 8/1973 | Martin | 340/80 |
| 3,825,914 | 7/1974 | Schacket | 340/251 |
| 3,898,513 | 8/1975 | Kopernik et al. | 315/129 |
| 3,995,262 | 11/1976 | France et al. | 340/251 |
| 4,041,451 | 8/1977 | Zarkadas | 340/79 |
| 4,206,385 | 6/1980 | Wisbey | 315/119 |
| 4,496,838 | 1/1985 | Umemoto et al. | 250/588 |
| 4,550,303 | 10/1985 | Steele | 340/80 |
| 4,646,058 | 2/1987 | Mandel et al. | 187/100 |
| 4,667,187 | 5/1987 | Volk et al. | 340/641 |
| 4,668,946 | 5/1987 | Volk et al. | 340/641 |
| 4,682,085 | 7/1987 | Kuhnel et al. | 315/307 |
| 4,754,145 | 6/1988 | Kobayashi | 250/484.1 |
| 5,023,515 | 6/1991 | Olon et al. | 315/88 |
| 5,025,197 | 6/1991 | Ganser et al. | 315/172 |
| 5,027,034 | 6/1991 | Ruby et al. | 315/106 |
| 5,041,761 | 8/1991 | Wright et al. | 315/129 |
| 5,057,814 | 10/1991 | Onan et al. | 340/458 |
| 5,068,570 | 11/1991 | Oda et al. | 315/128 |
| 5,089,753 | 2/1992 | Mattas | 315/324 |
| 5,103,137 | 4/1992 | Blake et al. | 315/119 |
| 5,105,124 | 4/1992 | Futsuhara et al. | 315/129 |

*Primary Examiner*—Carolyn E. Fields
*Attorney, Agent, or Firm*—William F. Noval

[57] ABSTRACT

A storage phosphor imaging system has at least two pairs of erase lights and an erase light failure detection circuit. When none of the erase lights are failed, the storage phosphor is erased for a predetermined time. When failure of one of the pairs of erase lights is detected, the storage phosphor is erased for an additional time. When more than one pair fails, the storage phosphor is erased for no more than the predetermined time and the additional time, then the storage phosphor is moved to the loading station, and the user is prompted that the storage phospor may not be fully erased.

5 Claims, 5 Drawing Sheets

STORAGE PHOSPHOR READER HAVING ERASE LAMP FEATURE FAILURE DETECTION

FIELD OF THE INVENTION

This invention relates generally to storage phosphor systems in which a latent x-ray image is recorded in a storage phosphor. A storage phosphor reader converts the stored latent x-ray image into an x-ray image signal. After conversion, the storage phosphor is erased and reused. This invention relates more particularly to a storage phosphor reader having erase lamp failure detection.

BACKGROUND OF THE INVENTION

In a storage phosphor imaging system as described in U.S. Pat. No. Re. 31,847, reissued Mar. 12, 1985, to Luckey, a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or hologon. The emitted radiation from the storage phosphor is reflected by a mirror light collector and detected by a photodetector, such as a photomultiplier, to produce an electronic image signal. Typically the storage phosphor is translated in a page scan direction past the laser beam which is repeatedly deflected in a line scan direction perpendicular to the page scan motion of the storage phosphor to form a scanning raster pattern of a matrix of pixels.

In order to be able to reuse the storage phosphor, any residual image in the storage phosphor is erased by exposing it to light from suitable erase lamps, such as fluorescent lamps. If one or more erase lamps fail, erasure of the storage phosphor will be incomplete leaving a residual image in the storage phosphor. When it is reused, a new latent x-ray image will be recorded over the residual image resulting in unacceptable image degradation which can result in improper diagnosis. U.S. Pat. No. 4,754,145, issued Jun. 28, 1988, inventor Kobayashi, discloses a radiation image erase unit for use with stimulable phosphor sheets. The erase unit has a detecting means for detecting a reduction in the illuminance of an erasure light and for producing a signal indicative of the light reduction. The embodiment shown in FIG. 6 of this patent has a current sensor for each erasing light source to detect failure of individual light sources. This embodiment is expensive and complex.

There is thus a problem in the prior art of providing apparatus which detects the failure of lamps used in erasing a residual image in a storage phosphor and which is cost effective, efficient and relatively simple.

SUMMARY OF THE INVENTION

According to the present invention there is provided a solution to this problem in the prior art of detecting erase light failure in a storage phosphor imaging system.

According to an aspect of the present invention, there is provided, in a storage phosphor imaging system, which includes a source of stimulating light, a scanner for scanning a storage phosphor storing a latent x-ray image with said stimulating light in a raster pattern to produce an emitted light x-ray image, and a photodetector for converting said emitted light x-ray image into an x-ray image signal, apparatus for erasing any residual image in said storage phosphor comprising:

- at least one pair of fluorescent lights electrically connected in series for erasing any residual image in said storage phosphor;
- a source of electrical current for said at least one pair of erase lights;
- a ballast connected between said source of electrical current and said at least one pair of fluorescent lights;
- an electromagnetic field current sensor for sensing the electrical current from said current source to said ballast; and
- a detector electrically connected to said sensor for detecting a decrease in the current supplied to said ballast and said pair of fluorescent lights as an indication of a failure in one or both of said lights.

DESCRIPTION OF THE PREFERRED EMBODIMENTS

Figure 1:
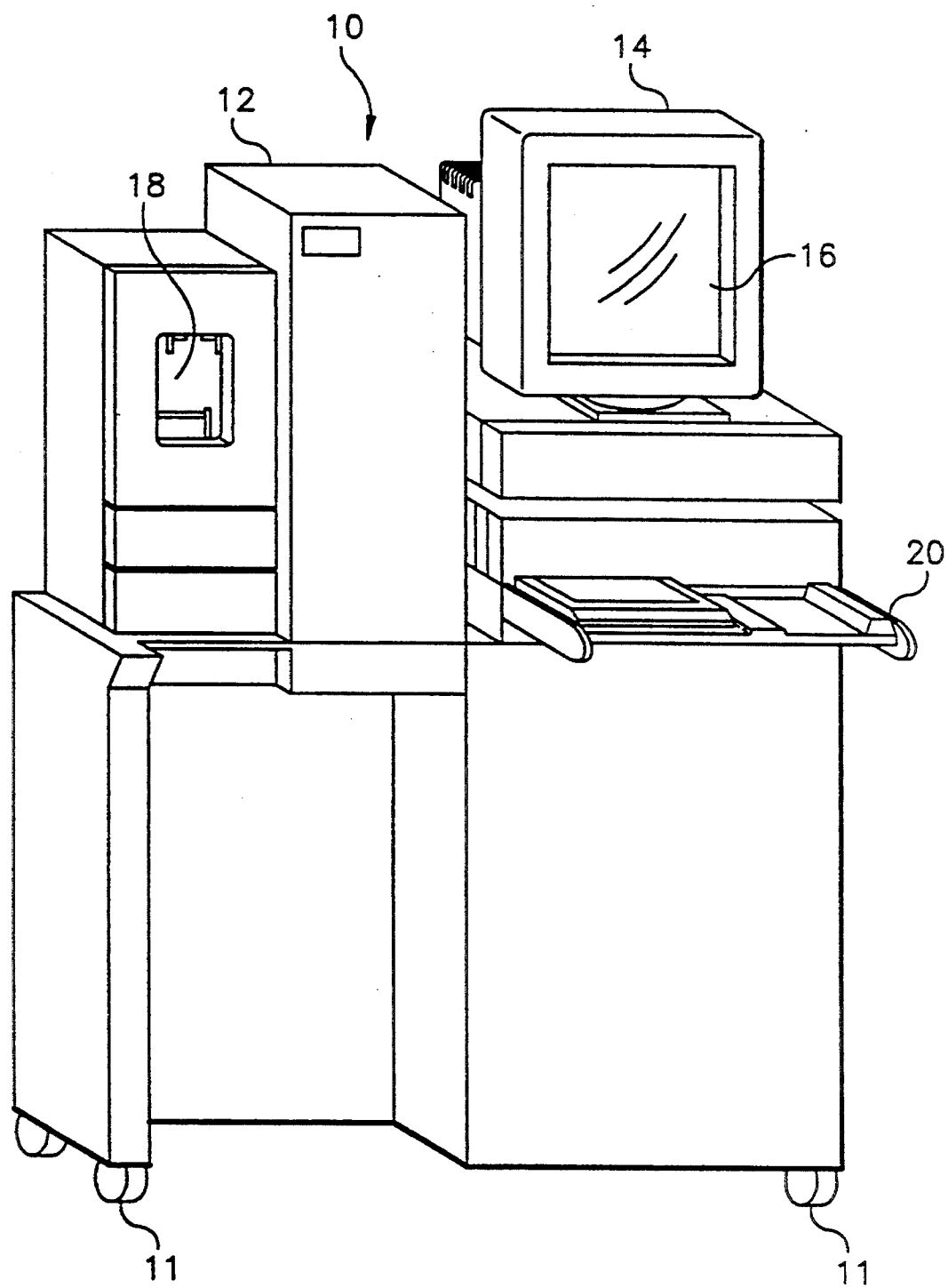
FIG. 1 is a perspective view of a storage phosphor reader incorporating the present invention.

Referring now to FIG. 1, there is shown a storage phosphor reader 10 incorporating an embodiment of the present invention. Reader 10 is mounted on casters 12 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 scans the storage phosphor plate and converts the latent x-ray image stored therein into an electrical x-ray image signal which can be viewed on monitor 14. The x-ray image signal is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates are erased and reused repeatedly. The optional hand held bar code reader is used to collect exam information at the time the storage phosphor plate is exposed to an x-ray image. The exam information is transferred to the storage phosphor reader 10 when it is mounted in download station 18. The exam information is linked to a corresponding x-ray image signal read from the storage phosphor plate.

In general, the storage phosphor reader is usable in the storage phosphor patient identification system disclosed in commonly assigned U.S. patent application Ser. No. 963,036, filed Oct. 19, 1992, inventor Good et al. The storage phosphor patient identification system disclosed in the latter patent application is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading it on load platform 20. Scanning is initiated when the technologist presses a start button on touch screen 16.

Inside storage phosphor reader 10 the storage phosphor plate is extracted from the cassette and scanned with a laser light to produce an x-ray image signal. As the plate is scanned, the image appears on touch screen 16 as it is being scanned. After the scanning is complete, the x-ray image signal is sent to a receiving device where it can be tonescaled, enhanced, viewed, printed and/or stored. After the storage phosphor plate has been completely scanned it is erased by exposure to light which removes any residual image stored in the storage phosphor. The storage phosphor reader 10 then places the storage phosphor plate back into its cassette. The technologist can now remove the cassette from reader 10 to be reused for another exam.

Figure 2:
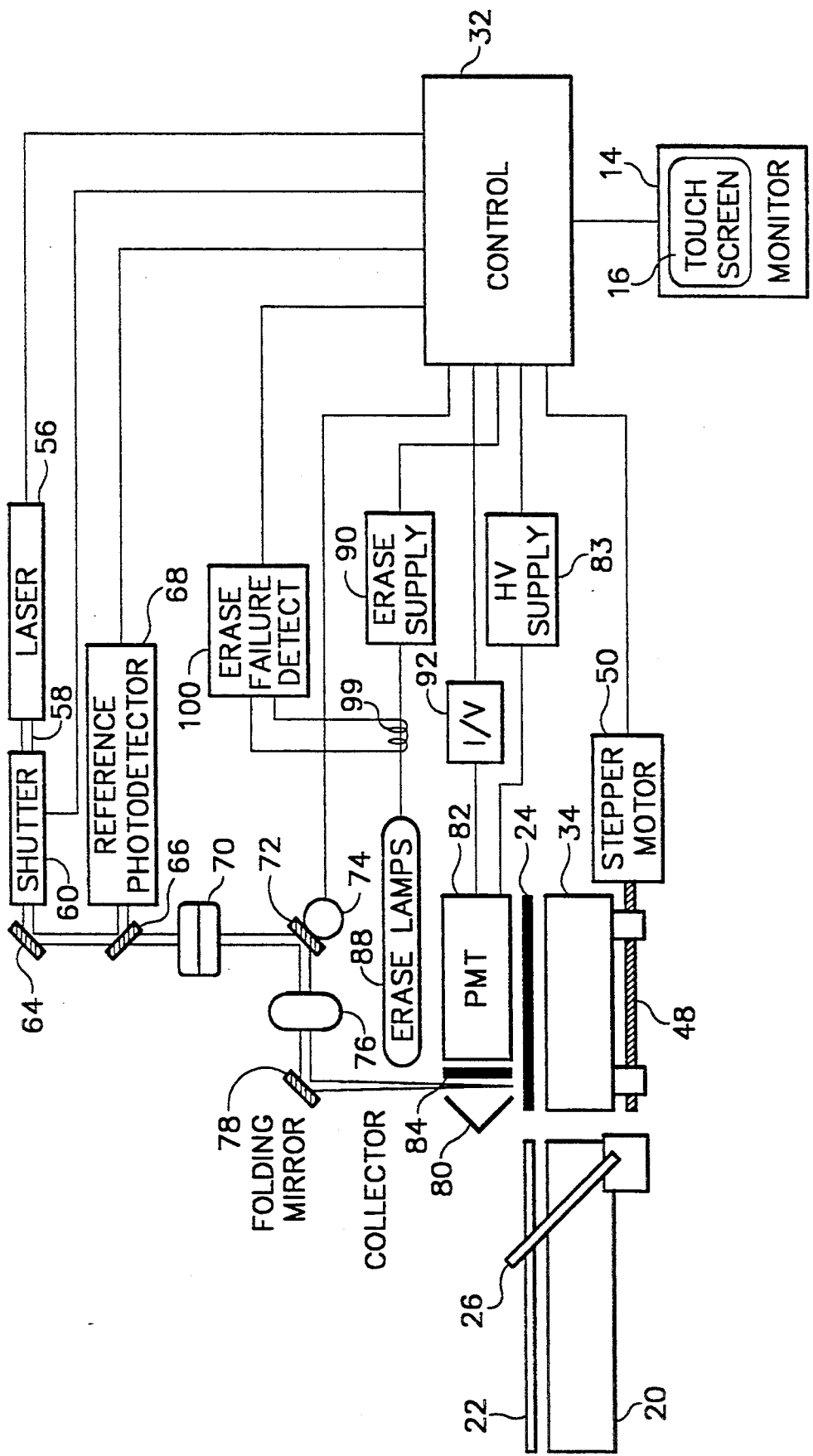
FIG. 2 and 3 are respectively a partially diagrammatic, partially schematic view and a perspective view of components of the storage phosphor reader of FIG. 1.
Figure 3:
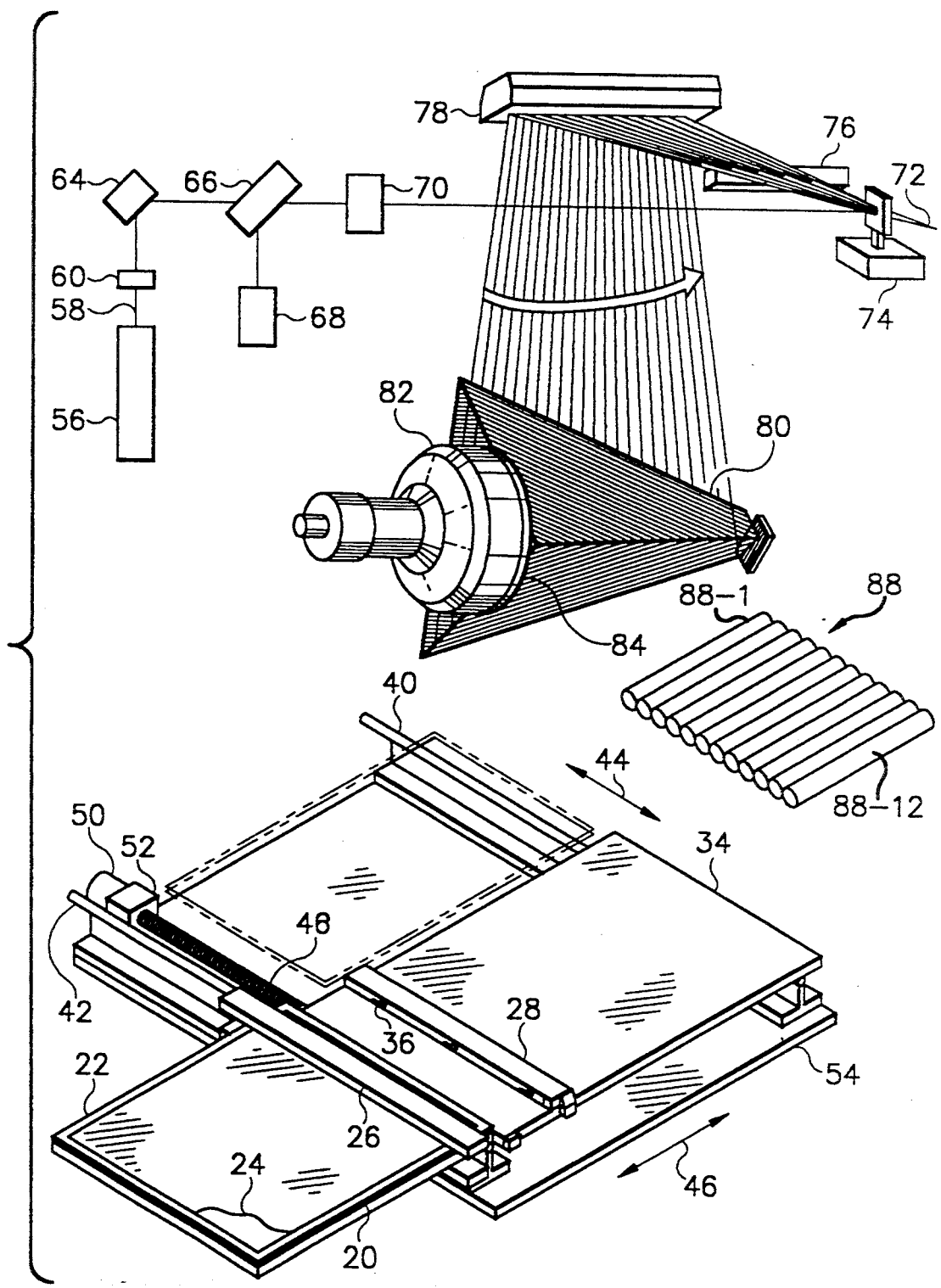

Referring now to FIGS. 2 and 3 there will be described in greater detail a preferred embodiment of storage phosphor reader 10 incorporating the present invention. As shown, a storage phosphor cassette 22 containing a storage phosphor plate 24 is loaded on cassette load platform 20. Load lever 26 is rotated to clamp cassette 22 in place and to unlatch the cassette 22 to permit extraction of storage phosphor plate 24 therefrom. Storage phosphor plate 24 is extracted from cassette 22 by extraction device 28 (FIG. 3) which is under software control from control 32. Control 32 includes standard computer components such as a microprocessor, a magnetic disk drive for storing images, software applications and a computer operating system, and input and output devices to communicate with the components of reader 10. Such microcomputer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser or a diode laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24 for laser beam 58. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto a photodetector, such as, photomultiplier tube (PMT) 82 which converts the emitted light into an x-ray image signal. PMT 82 is powered by high voltage supply 83. A filter 84 in front of the face of PMT 82 blocks the scattered stimulating laser light and passes the light emitted by storage phosphor plate 24.

Once a storage phosphor plate 24 is completely moved on to translation stage 34, a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34 the control 32 controls stepper motor 50 to move the stage 34 to the point where the storage phosphor plate 24 is under collector 80. At this point, conversion of the latent x-ray image stored in storage phosphor plate 24 into an x-ray image signal begins. At the end of the scan (determined by the number of scan lines for the appropriate storage phosphor plate size), PMT 82 and galvanometer 74 are turned off and translation stage 34 is returned to the home position.

Immediately after translation stage 34 reaches the home position, an erase lamp assembly 88 is turned on by actuation of erase power supply 90 under software control from control 32. Following a predetermined erase time (such as 30 seconds) erase lamp assembly 88 is turned off and extraction mechanism 28 returns storage phosphor plate 24 in the direction of arrow 46 to storage phosphor cassette 22. During the erase time, stage 34 and extraction mechanism 28 are disabled to prevent removal of plate 24 until erasure is complete. The storage phosphor reader user can now remove cassette 22 from loading platform 20.

During the scan of storage phosphor plate 24 an emitted x-ray light image is converted by PMT 82 into an x-ray image signal. This signal is converted to a voltage by I/V amplifier 92. Laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and examination information are downloaded into reader 10 from a hand held bar code scanner positioned in station 18 of reader 10. As each storage phosphor plate 24 is extracted from its cassette 22, a bar code reader in reader 10 reads a storage phosphor bar code on plate 24. The image data and corresponding patient and exam information are correlated by control 32.

According to the present invention, erase lamps 88 are monitored by an electromagnetic field current sensor 99 and erase failure detect circuit 100 (FIG. 2) to detect a failure of one of more lamps. Such a failure can produce an incomplete erasure of storage phosphor plate 24 leaving a residual image in the storage phosphor. When storage phosphor plate 24 is reused, a new latent x-ray image will be recorded over the residual image resulting in image degradation and possible improper diagnosis.

Figure 4:
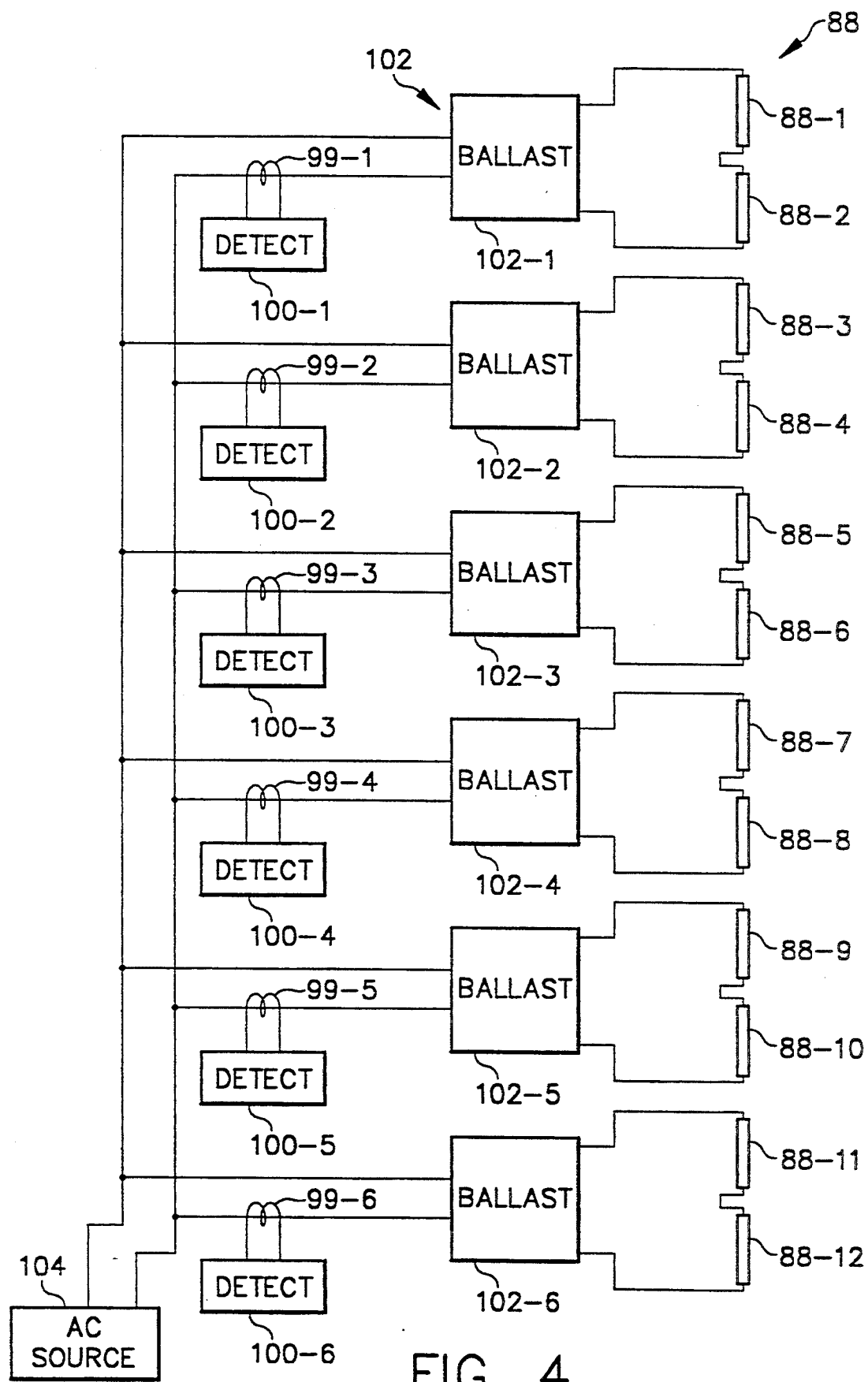
FIG. 4 is a schematic diagram of a storage phosphor erase apparatus according to an embodiment of the present invention.

As shown in FIG. 2 and in greater detail in FIG. 4, erase lamp assembly 88 includes twelve fluorescent lamps, 88-1 to 88-12, arranged in pairs. Each pair of erase lamps are electrically connected in series to a ballast 102. Thus, erase lamps 88-1 and 88-2 are connected in series to ballast 102-1; erase lamps 88-3 and 88-4 are connected in series to ballast 102-2; erase lamps 88-5 and 88-6 are connected in series to ballast 102-3; erase lamps 88-7 and 88-8 are connected in series to ballast 102-4; erase lamps 88-9 and 88-10 are connected in series to ballast 102-5; and erase lamps 88-11 and 88-12 are connected in series to ballast 102-6.

An alternating current (AC) source 104 supplies AC current to erase lamps 88-1 to 88-12 through ballasts 102-1 to 102-6. AC current is sensed between source 104 and ballasts 102-1 to 102-6 by electromagnetic field current sensors 99-1 to 99-6. A current sensor, 99-1 to 99-6, senses the electromagnetic field produced by current in a conductor surrounded by the sensor. An exemplary current sensor is type CTL-6-S distributed by U.R.D. America Inc., Laguna Niguel, Calif.

Detect circuits 100-1 to 100-6 are respectively connected to current sensors 99-1 to 99-6. Detect circuits 100-1 to 100-6 detect failure of one or both erase lamps 88-1 of a pair. Because each pair of erase lamps 88 are connected in series, failure of one erase lamp will extinguish the other erase lamp causing a large drop in AC current to the corresponding ballast 102. This drop in AC current is sensed by current sensor 99 and detected by detect circuit 100. Detect circuit 100 is a erase lamp failure signal sent to control 32.

Erase lamp failure can be detected during operation of reader 10 or during a diagnostic routine before reader 10 is used. Detect circuits 100-1 to 100-6 can produce six separate erase lamp failure signals. Thus, an individual lamp failure can be isolated to a pair of erase lamps. Because a current sensor is used for every two lamps, the erase lamp failure circuitry and detect circuit is simpler and less expensive than if each erase lamp had its own sensor and detector circuit.

According to a feature of the present invention, if only one erase lamp failure signal is received by control 32 during the erase period of a storage phosphor plate 24, control 32 will issue a second erase cycle command to erase lamp assembly 88. The storage phosphor plate 24 will go through a second complete erase cycle. If, however, two or more erase lamp failure signals are received, control 32 will cause the plate 24 to be removed from the erase station, inserted back into cassette 22 and prompt the reader user that the plate 24 may not be fully erased.

Figure 5:
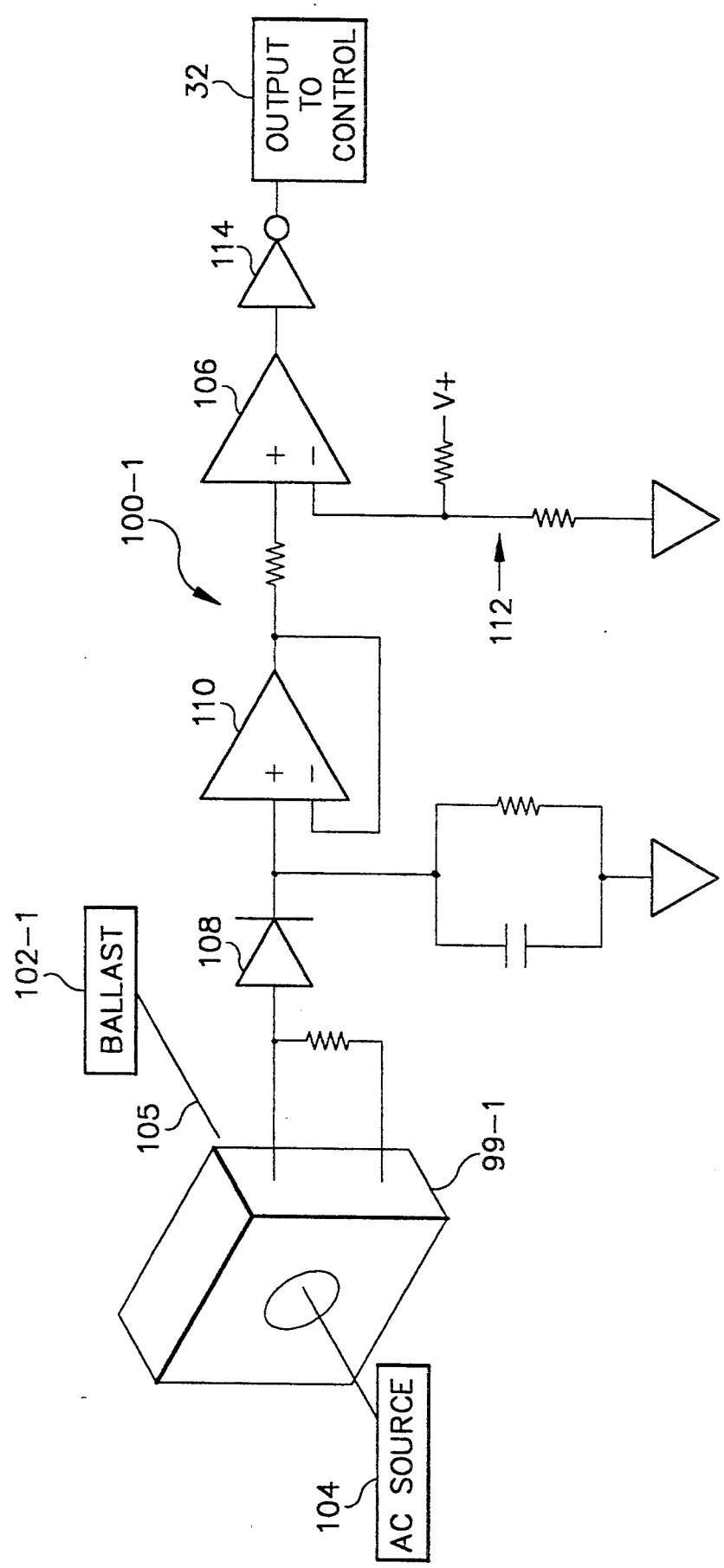
FIG. 5 is a schematic diagram of a erase light failure detect circuit of FIG. 4.

Referring now to FIG. 5, there is shown a schematic diagram of a detect circuit 100-1. Reference will be made to detect circuit 100-1, but it will be understood that detect circuits 100-2 to 100-6 are identical to detect circuit 100-1. As shown, detect circuit 100-1 is connected to current sensor 99-1 which surrounds an electrical conductor 105 from AC source 104 to ballast 102-1. The output of sensor 99-1 is supplied to the "+" input of comparator 106 by way of diode 108 and buffer amplifier 110. A reference voltage is applied to the "−" input of comparator 106 by means of voltage divider network 112. The output of comparator 106 will be zero if the proper current is supplied to ballast 102-1 indicating that erase lamps 88-1 and 88-2 are operating. Should one or both of erase lamps 88-1, 88-2 fail, the current will drop substantially causing the voltage applied to the "+" input of comparator 106 to drop. Comparator 106 will produce an erase lamp failure signal which is supplied to control 32 by way of inverter 114.

The present invention finds application in medical diagnostic imaging systems, such as storage phosphor imaging systems.

Although the invention has been described with reference to preferred embodiments thereof, it will be understood that variations and modifications can be effected within the spirit and scope of the invention as described above and as defined in the appended claims.

What is claimed is:

1. A storage phosphor reader comprising:
   a loading station for loading and unloading a storage phosphor from a cassette for containing said storage phosphor;
   a scanning station for converting a latent x-ray image stored in a storage phosphor into an x-ray image signal;
   an erasing station for erasing any residual image in a scanned storage phosphor, said erasing station including at least two pairs of fluorescent erase lights;
   a storage phosphor translation assembly for translating a storage phosphor along a path from said loading station to said scanning station, to said erase station and back to said loading station;

an erase light failure detection circuit for selectively detecting when one or two of said at least two pairs of fluorescent erase lights have failed; and control means for controlling said storage phosphor translation assembly and said at least two pairs of fluorescent erase lights a) to erase said storage phosphor at said erase station for a predetermined period of time, when said erase light failure detection circuit detects failure of none of said at least two pairs of fluorescent erase lights; b) to erase said storage phosphor at said erase station for an additional predetermined period of time, when said erase light failure detection circuit detects failure of one of said at least two pairs of fluorescent erase lights; and c) to erase said storage phosphor at said erase station for no more than said predetermined period of time and said predetermined additional period time, to translate said storage phosphor from said erase station to said loading station, and to prompt a reader user that the storage phosphor may not be fully erased, when said erase light failure detection circuit detects failure of two or said at least two pairs of fluorescent erase lights.

2. The reader of claim 1 wherein each pair of said at least two pairs of fluorescent erase lights, includes a source of electrical current, and a ballast connected between said source of electrical current and said pair of fluorescent erase lights; and wherein said erase light failure detection circuit includes, for each pair of said at least two pairs of fluorescent erase lights, an electromagnetic field current sensor located between said source of electrical current and said ballast for producing a signal representative of electrical current from said source to said pair of fluorescent erase lights, and a detector connected to said sensor for producing an erase light failure detection signal when one or both of said pair of lights fails.

3. The reader of claim 2 wherein said source of electrical current is a source of alternating current; and wherein said current sensor senses the electromagnetic field produced by the alternating current supplied to said pair of fluorescent erase lamps.

4. The reader of claim 2 wherein said detector includes a comparator for comparing said sensor signal to a predetermined value and for producing said lamp failure detection signal when there is a difference between said sensor signal and said predetermined value.

5. The reader of claim 2 wherein said sensor produces a current signal and wherein said detector includes a current-to-voltage amplifier which converts said sensor current signal to a sensor voltage signal, and further includes a voltage comparator for comparing said sensor voltage signal to a predetermined voltage and for producing said lamp failure detection signal when there is a difference in said compared voltage.

* * * * *